United States Patent [19]

Hall et al.

[11] 4,008,471
[45] Feb. 15, 1977

[54] CORRELATOR TO REDUCE BIN STRADDLE IN A COLLISION AVOIDANCE SYSTEM

[75] Inventors: James Robert Hall, Canoga Park; John Jeffrey Lyon, Chatsworth, both of Calif.

[73] Assignee: RCA Corporation, New York, N.Y.

[22] Filed: Dec. 22, 1975

[21] Appl. No.: 643,026

[30] Foreign Application Priority Data

Apr. 14, 1975 United Kingdom ............ 15219/75

[52] U.S. Cl. .................... 343/6.5 LC; 343/100 CL
[51] Int. Cl.² .......................................... G01S 9/56
[58] Field of Search ................ 343/6.5 LC, 100 CL

[56] References Cited

UNITED STATES PATENTS 3,887,916  6/1975  Goyer ........................... 343/6.5 LC Primary Examiner—Maynard R. Wilbur
Assistant Examiner—Richard E. Berger
Attorney, Agent, or Firm—Edward J. Norton; Joseph D. Lazar

[57] ABSTRACT

In a cooperative collision avoidance system the detected reply signals to interrogation probe signals are correlated by a digital circuit that processes all the reply signals identifying targets over non-targets ("fruit"). The correlator is capable of detecting all targets in any desired range during a given correlation period and is provided with means to reduce the effect of bridging or straddling adjacent bins in the correlator to minimize thereby the duplication of detected replies which would overload the following processor and cause loss of desired replies.

2 Claims, 2 Drawing Figures

CORRELATOR TO REDUCE BIN STRADDLE IN A COLLISION AVOIDANCE SYSTEM

CROSS REFERENCE TO RELATED APPLICATIONS

Of interest are the following copending patent applications: Ser. No. 569,995, filed Apr. 21, 1975, entitled "Full Range Correlator for use in a Collision Avoidance System," based on the invention of J. E. Miller; Ser. No. 643,481, filed Dec. 22, 1975, entitled "Multi-Target Tracker," based on the invention of J. E. Miller; and, Ser. No. 643,478, filed Dec. 22, 1975, entitled "Multi-Target Tracker for Tracking Near Co-Range Targets," based on the invention of W. L. Ross, both filed on or about even date herewith and assigned to the same assignee as the assignee of the present patent application.

BACKGROUND OF THE INVENTION

1. Field of the Invention

This invention relates to a correlator useful in a vehicular collision avoidance system.

2. Description of the Prior Art

Collision avoidance systems have been proposed as means of preventing collisions by vehicles both of the maritime vessel type and of the airborne type. Cooperative systems of the asynchronous type include interrogator-transponder techniques in which interrogation signals or probes are transmitted from one vehicle on a random basis. Vehicles in the vicinity receiving such probes respond with signals of various indicia to provide to the interrogation vessel information relating to both range and information identifying the vessel and its position. In airborne systems such information may include the relative or actual altitude of the aircraft.

An existing collision avoidance system known by the acronym SECANT (Separation Control of Aircraft by NonSynchronous Techniques) employs probes identified by any one of a plurality of frequencies and replies using different frequencies of the same band but arranged into a predetermined correspondence to a particular probe frequency. Special correlation techniques separate the true reply received by any one vehicle from received reply signals induced by probes from remote vehicles, the latter replies being identified as fruit. Such a system is described in U.S. Pat. No. 3,755,811 issued Aug. 28, 1973, and U.S. Pat. No. 3,803,608 issued Apr. 9, 1974, based on the inventions of Jack Breckman.

A full range correlator of the type described in U.S. Pat. No. 3,887,916 issued June 3, 1975, to R. B. Goyer for "Correlator and Control System for Vehicular Collision Avoidance" allows signals representing a target to bridge or straddle adjacent correlator bins. In general, the correlator disclosed in the Goyer patent provides for receiving signals after thresholding that are in the order of 1.2 to 1.5 microseconds wide. For a system in which the correlator bins are 500 feet in range, i.e., 1.0 microseconds wide, the received signals being phased with respect to the range bins as a function of the distance of the replying vehicle, it is possible for a strong return to be coincident with portions of two or three bins. Further, the addition of system noise introduces a phase jitter of about 0.1 microseconds so that the portion of the bin that is occupied by a given reply may vary from one reply signal to the next reply signal. The Goyer correlator (patent, supra) operating at a 10 MHz sampling rate gererates 10 samples during each bin period. The number of segments of bins that are thus occupied by a replied pulse is accumulated in the counter representing that 500 foot range bin. For an operation of such a correlator utilizing a program of 25 pulses to correlate replies for reliable and accurate target identification, a maximum of 250 counts can be accumulated for a series of replies coincident with a particular 500 foot range bin. The condition that is termed "failed to correlate" is identified by a preselected threshold arranged in one of the SECANT system applications to operate at less than 100 out of 250 counts. A reply pulse occupying only four of the 25 sampled periods in a bin would correlate if there were, in fact, no missing replies. A pulse occupying five periods could be missing five of the 25 replies, and yet fewer replies will correlate as a larger portion of the bin is occupied. For such a system, only 10 replies are required for a pulse occupying the complete 500 foot bin. One implementation of the correlator described in the above-identified Miller "Correlator," copending application, Ser. No. 569,995, uses long shift registers in a multiple-bin, parallel counter array, with a "failed to correlate" threshold of 10 out of 25. Since a bin of such a correlator is sampled only for occupancy during any portion of the microsecond to effect a count of one, a pulse of 1.2 to 1.5 microseconds could correlate in two or three adjacent bins. A "hand-off" of one target to two or three tracker assignments could seriously reduce the capability of a tracker for multiple targets such as described in the copending applications of Miller, Ser. No. 643,481 and Ross, Ser. No. 643,478 if such a hand-off occurred. It appears that the individual 500 foot bin could be sampled at a 10 MHz rate and the count entered in a range parallel counter register to obtain the same performance. Such a modification however would require significantly more hardware. It would appear that the result of a 10 MHz sample count rate could be thresholded whereby only a count of "1" be entered in the correlator shift register array. For such an arrangement, only the small precounter operating at 10 MHz would be required, which is only a small increase in hardware.

SUMMARY OF THE INVENTION

According to the present invention, a threshold of a portion of a predetermined number of replies is selected to reject substantially all of the replies occupying a small portion of a range bin. By providing for pre-sampling and thresholding, only those targets that straddle the interface of two adjacent bins have any probability of correlating as two adjacent tracker assignments whereby no pulses are capable of being correlated in three adjacent bins. In the preferred form of the invention, the threshold is set at five out of nine samples to permit a 0.1 microsecond time slot for transfer of a threshold output to the correlator shift registers.

DESCRIPTION OF A PREFERRED EMBODIMENT

Figure 1:
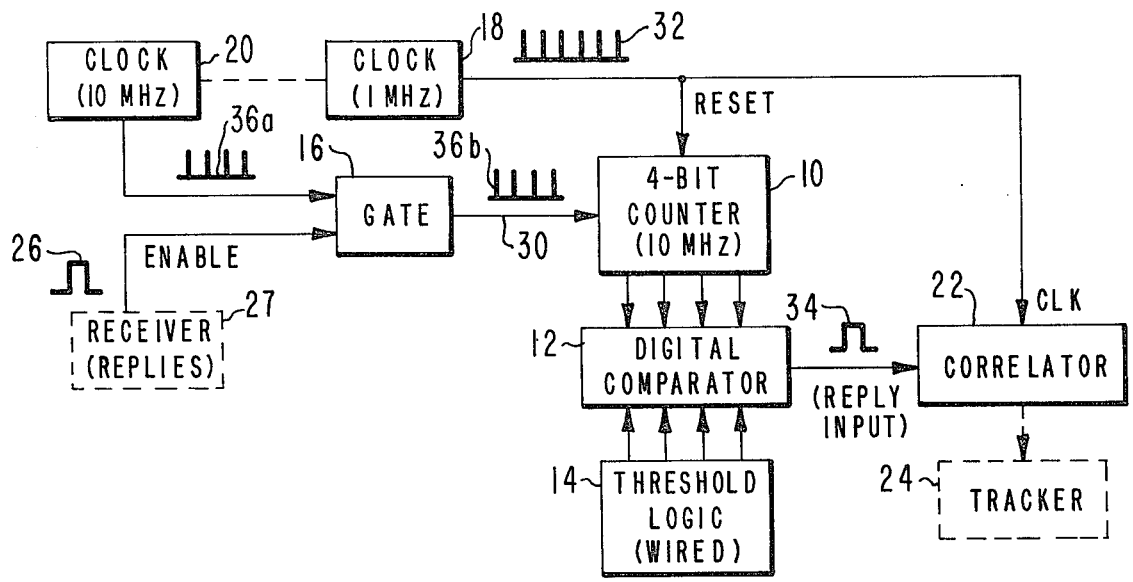
FIG. 1 is a simplified block diagram showing the logic arrangement according to the present invention cooperating with a correlator and a tracker of a typical collision avoidance system.
Figure 2:
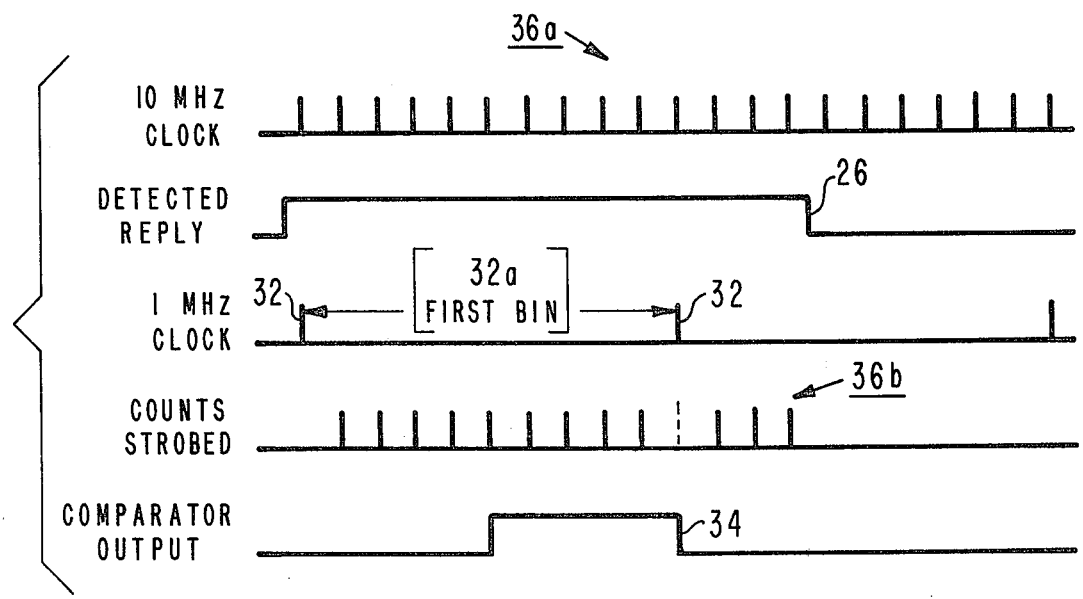
FIG. 2 is a waveform and timing chart showing several of the signals that are used or generated by the system.

FIG. 1 is a diagram embodying the invention comprising a counter 10, a comparator 12, threshold logic 14, and AND gate 16. FIG. 2 shows several of the signals related to the circuit. The above components are clocked by a 1 MHz clock 18 and a 10 MHz clock 20. These components are in cooperative association with a correlator 22 and a tracker 24. The organization and operation of a collision avoidance system comprising typically a correlator 22 and a tracker 24 are described in more detail in the above-identified Breckman patents and more particularly in the Goyer U.S. Pat. No. 3,887,916 disclosing an embodiment of a correlator utilizing counters. A preferred form of the correlator is disclosed in the above-identified copending application of J. E. Miller, Ser. No. 569,995. A suitable tracker is disclosed and described in detail in U.S. Pat. No. 3,803,604, issued Apr. 9, 1974 to Bernard Case. A preferred tracker is disclosed in the above-identified copending applications relating to Multi-Target Trackers.

The SECANT system, in particular the SECANT-type correlator, operates in a cooperative system in which probe signals designated as P and Q are transmitted to the environment seeking replies from cooperative vehicles. Replies are received through suitable antennae and processed through a receiver 27 to generate detected replies 26. A suitable receiver is described in U.S. Pat. No. 3,848,191 issued to L. H. Anderson on Nov. 12, 1974. A given number of replies will cause the correlator to pass the target, known as a "hand-off" procedure, to the tracker 24 for further tracking of the target.

As explained above in the discussion of the prior art, the detected reply pulses 26 could occupy or exist during a certain number of sampling periods determined by clock 18. Typical interrogation pulses are made at 1,000 times per second, each probe pulse being 1 microsecond wide. A reply pulse to such probe pulses are theoretically 1 microsecond wide but after being processed through the receiver equipment are in the order of 1.2 to 1.5 microseconds wide. A range bin (a stage of a shift register) of the correlator 22 being typically one microsecond, it is apparent that a reply signal 26 of more than one microsecond could bridge at least two such bins.

The detected reply signals 26 are used as an enable signal for an AND gate 16 for passing 10 MHz clock signals as strobed signals 36b over path 30 to a four bit counter 10. Correlator 22 is clocked from a 1 MHz clock 18 by clock pulses 32 which are also used to reset counter 10. The 1 MHz clock 18 is derived from the 10 MHz clock 10, as indicated by the dotted line, so that timing relationship is constant. A digital comparator 12 monitors the contents of counter 10 and compares that count value to pre-set threshold logic 14. Counter 10 incremented by clock 20 during the period of each reply 26 will cause comparator 12 to generate an output signal 34 whenever the strobe counts 36b to counter 10 exceed a predetermined or thresholded value. In general, a threshold of 5 out of 10 samples of the reply signals is selected as being a value which will reject substantially most of the replies that occupy only a small portion of a one microsecond bin of correlator 22. By such a procedure of presampling and thresholding a portion of the replies, only those targets represented by reply signals 26 that straddle the interface of two adjacent bins have any probability of being correlated as two separate tracker assignments, which, of course, would be erroneous. No reply signal 26 can be correlated in three adjacent bins. In a preferred form of the invention, the threshold value of threshold logic 14 is arranged to be set at five out of nine such samples of the reply to permit a 0.1 microsecond time slot for transfer of the threshold exceedances to a preferred form of the correlator 22 described in the above-identified pending application, Ser. No. 569,995, and for resetting counter 10 at the correlator bin boundary.

The timing chart and waveform diagrams in FIG. 2 illustrate typical processing of a reply that assures no straddling of a bin. The gated 10 MHz clock pulses 36b actuating the counter 10 and correlator 22 define a first bin 32a of the correlator between two (1 MHz) clock pulses 32 as indicated along the 1 MHz clock train. A detected reply 26 is shown to bridge bin 32a. The strobed (10 MHz) counts 36b from gate 16, providing the strobe for counter 10, are shown in relation to clock pulses 32 and the reply signal 26. Note that there are nine strobes 36b within the bin 32a. The reset of counter 10 by clock signals 32 causes the strobed clock pulses 36b to be suppressed as the counter is reset, the suppressed pulse 36b thus being effectively the tenth sample.

The output pulse 34 from comparator 12, as shown in FIG. 2, occurs within the first bin 32a. Note that five strobe pulses 36b occurred before the generation of ouptut signal 34, and that signal 34 is terminated when counter 10 is reset. Accordingly, the correlator 22 receives a reply 26 sampled and thresholded as signal 34 at a time occurring during the first bin and does not occur in the preceeding bin or the succeeding bin.

It will thus be appreciated that in accordance with the present invention a correlator of the bin type may be arranged to receive and process reply signals that will not straddle adjacent bins but will be identified in association with the bin comprising the larger portion of the reply signal.

What is claimed is:

1. A circuit for correlating pulse reply signals generated by remote stations in response to probe signals from interrogation stations, said circuit including a correlator of the type having sequenced storage means for storing and sequencing at a given rate into bins signals applied to an input of said correlator corresponding to said reply signals, a significant portion of said reply signals having a width greater than a predetermined portion of the width of said bins, said correlator including counting means for counting said reply signals, the improvement comprising:
    means for sampling said received pulse reply signals at a rate significantly greater than the rate of sequencing said storage bins;
    means for counting said sampled signals at said given rate to provide a count of sampled signals;
    means for comparing said sample count to a threshold value to generate thereby a thresholded output signal to increment said correlator counting means for samples producing a count greater than said threshold; and
    means for coupling said thresholded output signal to said correlator counting means whereby only those reply signals exceeding a predetermined portion of a correlator range bin will increment the count of reply signals in said correlator.

2. A circuit according to claim 1 wherein said threshold value is five counts representing five-tenths of the width of said correlator bin.

* * * * *